US008786585B2

(12) United States Patent
Longhurst et al.

(10) Patent No.: US 8,786,585 B2

(45) Date of Patent: Jul. 22, 2014

(54) SYSTEM AND METHOD FOR ADJUSTING DISPLAY BASED ON DETECTED ENVIRONMENT

(75) Inventors: Peter W. Longhurst, Vancouver (CA); Eric Kozak, Burnaby (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 171 days.

(21) Appl. No.: 13/578,250

(22) PCT Filed: Feb. 18, 2011

(86) PCT No.: PCT/US2011/025362

§ 371 (c)(1), (2), (4) Date: Aug. 10, 2012

(87) PCT Pub. No.: WO2011/103377

PCT Pub. Date: Aug. 25, 2011

(65) Prior Publication Data

US 2012/0320014 A1 Dec. 20, 2012

Related U.S. Application Data

(60) Provisional application No. 61/306,788, filed on Feb. 22, 2010.

(51) Int. Cl.

| | |
|---|---|
| ***G06F 3/038*** | (2013.01) |
| ***G09G 5/02*** | (2006.01) |
| *G09G 5/00* | (2006.01) |

(52) U.S. Cl.

CPC ............ *G09G 5/02* (2013.01); *G09G 2360/144* (2013.01); *G09G 2320/0242* (2013.01)

USPC .......................................................... 345/207

(58) Field of Classification Search

USPC .......................................................... 345/207

See application file for complete search history.

(56) References Cited

U.S. PATENT DOCUMENTS

| | | | |
|---|---|---|---|
| 3,200,193 | A | 8/1965 | Biggs |
| 4,451,849 | A | 5/1984 | Fuhrer |

(Continued)

FOREIGN PATENT DOCUMENTS

| | | |
|---|---|---|
| EP | 1719989 | 11/2006 |
| GB | 2389730 | 12/2003 |

(Continued)

OTHER PUBLICATIONS

Kim, Jong-Man, et al. "Illuminant-Adaptive Color Reproduction for Mobile Display" Proc. SPIE 6058, Color Imaging XI, from Conference vol. 6058, Jan. 15, 2006.

(Continued)

*Primary Examiner* — Van Chow

(74) *Attorney, Agent, or Firm* — John W. Carpenter

(57) ABSTRACT

In one embodiment the present invention includes a method that adjusts a display device according to a display environment. The method includes sensing the display environment of the display device and generating environment data that corresponds to the display environment. The environment data includes color data. The method further includes adjusting a color appearance model according to the color data, generating a control signal according to the color appearance model having been adjusted, and controlling a backlight of the display device according to the control signal. In this manner, a viewer perceives the images displayed by the display device in the manner intended by the content creator, because the adjustments to the color appearance model compensate for the viewer's physiological response to the display environment.

19 Claims, 9 Drawing Sheets

(56) References Cited

U.S. PATENT DOCUMENTS

| | | | | |
|---|---|---|---|---|
| 4,742,387 | A | 5/1988 | Oshima | |
| 5,270,818 | A | 12/1993 | Ottenstein | |
| 5,488,434 | A | 1/1996 | Jung | |
| 5,617,112 | A | 4/1997 | Yoshida | |
| 5,956,015 | A | 9/1999 | Hino | |
| 6,094,185 | A | 7/2000 | Shirriff | |
| 6,618,045 | B1 | 9/2003 | Lin | |
| 6,690,351 | B1 | 2/2004 | Wong | |
| 6,744,416 | B2 * | 6/2004 | Mizutani et al. | 345/88 |
| 6,870,529 | B1 | 3/2005 | Davis | |
| 6,947,017 | B1 | 9/2005 | Gettemy | |
| 7,019,758 | B2 * | 3/2006 | Hendry et al. | 345/600 |
| 7,046,843 | B2 | 5/2006 | Kanai | |
| 7,049,575 | B2 | 5/2006 | Hotelling | |
| 7,110,002 | B2 | 9/2006 | Wada | |
| 7,259,769 | B2 | 8/2007 | Diefenbaugh | |
| 7,301,534 | B2 | 11/2007 | Runolinna | |
| 7,312,779 | B1 | 12/2007 | Blevins | |
| 7,423,705 | B2 | 9/2008 | Len-Li | |
| 7,456,829 | B2 | 11/2008 | Fry | |
| 7,504,612 | B2 | 3/2009 | Yu | |
| 2001/0020922 | A1 | 9/2001 | Yamazaki | |
| 2003/0117413 | A1 | 6/2003 | Matsuda | |
| 2005/0037815 | A1 | 2/2005 | Besharat | |
| 2006/0088275 | A1 | 4/2006 | O'Dea | |
| 2007/0139405 | A1 | 6/2007 | Marcinkiewicz | |
| 2007/0211049 | A1 | 9/2007 | Kerofsky | |
| 2008/0049005 | A1 | 2/2008 | Okita | |
| 2008/0165115 | A1 | 7/2008 | Herz | |
| 2008/0186260 | A1 | 8/2008 | Lee | |
| 2008/0186262 | A1 | 8/2008 | Lee | |
| 2008/0186707 | A1 | 8/2008 | Ku | |
| 2008/0266316 | A1 | 10/2008 | Takahashi | |
| 2008/0303687 | A1 | 12/2008 | Sempel | |
| 2008/0303918 | A1 | 12/2008 | Keithley | |
| 2009/0040205 | A1 | 2/2009 | Scheibe | |
| 2009/0109129 | A1 | 4/2009 | Cheong | |
| 2012/0293473 | A1 * | 11/2012 | Lee et al. | 345/207 |
| 2013/0222408 | A1 * | 8/2013 | Lee et al. | 345/589 |

FOREIGN PATENT DOCUMENTS

| | | |
|---|---|---|
| JP | 61-16691 | 1/1986 |
| JP | 10-282474 | 10/1998 |
| WO | 9701240 | 1/1997 |
| WO | 2006003624 | 1/2006 |

OTHER PUBLICATIONS

Yoshida, Y. et al. "Ambient Light Adapted Imaging System with Reflective-Type LCD" SID Conference Record of the International Display Research Conference, published by Society for Information Display in Dec. 2001.

Author: Unavailable; "Ambient Light Adaptation Method with Multi-Sensor" published by Kenneth Mason Publication Ltd in Dec. 2006.

Maeda, K. et al. "Late-News Poster: The System-LCD with Monolithic Ambient-Light Sensor System" SID Symposium Digest of Technical Papers, vol. 36, Issue 1 pp. 356-359, May 2005.

* cited by examiner

300

| Parameter | Description |
|---|---|
| *Xw* | Tristimulus Whitepoint |
| *Yw* | Tristimulus Whitepoint |
| *Zw* | Tristimulus Whitepoint |
| *HPEwR* | Whitepoint converted to HPE space |
| *HPEwG* | Whitepoint converted to HPE space |
| *HPEwB* | Whitepoint converted to HPE space |
| *SigmaR* | Whitepoint sigma (used in inverse CAM) |
| *SigmaG* | Whitepoint sigma (used in inverse CAM) |
| *SigmaB* | Whitepoint sigma (used in inverse CAM) |
| *SigmaRp* | Whitepoint sigma^0.42 |
| *SigmaGp* | Whitepoint sigma^0.42 |
| *SigmaBp* | Whitepoint sigma^0.42 |
| *Lw* | Whitepoint LMS |
| *Mw* | Whitepoint LMS |
| *Sw* | Whitepoint LMS |
| *Aw* | Whitepoint achromatic response |
| *La* | Adapting field Luminance |
| *Yb* | Relative Background luminance |
| *c* | Exponential nonlinearity (surround impact) |
| *Nc* | Chromatic induction factor |
| *F* | Maximum degree of adaptation |
| *D* | Degree of adaptation |
| *n* | Induction factor |
| *n2* | n as it's used in the Chroma correlate calculations |
| *Z* | Base exponential nonlinearity |
| *Ncb* | Chromatic brightness induction factor |
| *Nbb* | Background brightness induction factor |
| *Fl* | Luminance level adaptation factor |
| *Fl100* | 1/100th Fl used for non linear adaption calc |
| *FlI* | Inverse Fl: (100 / Fl) |
| *cz* | c*z (nonlinearity) |

FIG. 7

| | |
|---|---|
| Compute_n | $n = \frac{Y_b}{Y_w}$ |
| Compute_D | $D = F\left[1 - \left(\frac{1}{3.6}\right)e^{\left(\frac{-(L_A+42)}{92}\right)}\right]$ |
| Compute_ncb | $N_{bb} = N_{cb} = 0.725(1/n)^{0.2}$ |
| Compute_Fl | $k = \frac{1}{5L_A + 1}$<br>$F_L = 0.2k^4(5L_A) + 0.1(1 - k^4)^2(5L_A)^{1/3}$ |
| Compute_Sigma | $\sigma_{wp} = 2588(D(wp/100) + (1 - D))$ |
| Compute_Non_Linear_ Adapt | $p = \left(\frac{F_L}{100}c\right)^{0.42}$<br>$response = 400\left(\frac{p}{\sigma^{0.42} + p}\right) + 0.1$ |
| Compute_Achroma _Resp | $A = N_{bb}(4.19L' + M' + 1.17S')$ |
| Compute_Part _Chroma | $n' = (1.64 - 0.29^n)^{0.73}$ |
| Compute_z | $z = 1.48 + \sqrt{n}$ |

FIG. 8

SYSTEM AND METHOD FOR ADJUSTING DISPLAY BASED ON DETECTED ENVIRONMENT

CROSS REFERENCE TO RELATED APPLICATIONS

This application claims priority to U.S. Patent Provisional Application No. 61/306,788, filed 22 Feb. 2010, hereby incorporated by reference in its entirety.

BACKGROUND

The present invention relates to display devices, and in particular, to reconfiguration of display devices according to their current environment.

Unless otherwise indicated herein, the approaches described in this section are not prior art to the claims in this application and are not admitted to be prior art by inclusion in this section.

A color appearance model (CAM, which may also be referred to as a "color model") is an abstract mathematical model describing the way colors can be represented as tuples of numbers, typically as three or four values or color components. When this model is associated with a precise description of how the components are to be interpreted (viewing conditions, etc.), the resulting set of colors is called color space. Examples of color spaces include the tristimulus color space, the XYZ color space (developed by the International Commission on Illumination [CIE], and which may also be referred to as the "CIE 1931 color space"), the red-green-blue (RGB) color space, the hue-saturation-value (HSV) color space, the hue-saturation-lightness (HSL) color space, the long-medium-short (LMS) color space, and the cyan-magenta-yellow (CMY) color space.

CAMs are useful to match colors under different environment conditions that otherwise might be perceived to be different, according to the human visual system (HVS). In particular, a color captured (e.g., in an image) under one set of conditions may be perceived as a different color by an observer viewing that color in another set of conditions. The following are examples of factors that can contribute to perceptible color mismatches: the different chromacities and/or luminance levels of different illuminants, different types of devices used to display the color, the relative luminance of the background, different conditions of the surrounding environment, as well as other factors. Conventional CAMs aim to compensate for these factors by adjusting an image viewed with a destination set of conditions so that it appears to be the same color at which it was captured with a source set of conditions. Thus, CAMs can be used to convert a patch of color seen in one environment (e.g., the source environment) to an equivalent patch of color as it would be observed in a different environment (e.g., the target environment).

As an example, consider the most recent CAM ratified by CIE, which is referred to as CIECAM02. CIECAM02 provides a limited ability to modify a color appearance model based on the environment of the display device. Three surround conditions (namely Average, Dim and Dark) provide the parameters given in TABLE 1:

TABLE 1

| Surround condition | Surround ratio | F | c | $N_c$ | Application |
|---|---|---|---|---|---|
| Average | $S_R > 0.2$ | 1.0 | 0.69 | 1.0 | Viewing surface colors |
| Dim | $0 < S_R < 0.2$ | 0.9 | 0.59 | 0.95 | Viewing television |
| Dark | $S_R = 0$ | 0.8 | 0.525 | 0.8 | Using a projector in a dark room |

In TABLE 1, the surround ratio $S_R$ tests whether the surround luminance is darker or brighter than medium gray (0.2). The parameter F is a factor that determines a degree of adaptation. The parameter c is a factor that determines the impact of the surroundings. The parameter $N_c$ is a chromatic induction factor. The color appearance model may be modified according to the parameters corresponding to the appropriate surround conditions.

SUMMARY

An embodiment of the present invention improves a color appearance model beyond a basic color appearance model. As discussed above, many basic CAMs (such as the CIECAM02 model as understood) provide only a limited ability to modify the CAM based on the environment of the display device. Furthermore, many basic CAMs (such as the CIECAM02 model as understood) do not define how various sensor results may be used to determine which of the three surround conditions is appropriate for a particular environment. In addition, many basic CAMs (such as the CIECAM02 model as understood) do not consider the interaction between a back modulator and a front modulator in a dual modulator display device.

According to an embodiment, a method adjusts a display device according to a display environment. The method includes sensing the display environment of the display device and generating environment data that corresponds to the display environment. The environment data includes color data. The method further includes adjusting a color appearance model according to the color data, generating a control signal according to the color appearance model having been adjusted, and controlling a backlight of the display device according to the control signal. In this manner, a viewer perceives the images displayed by the display device in the manner intended by the content creator, because the adjustments to the color appearance model compensate for the viewer's physiological response to the display environment.

The color appearance model may be adjusted according to the luminance of the display environment. Various parameters of the color appearance model may be adjusted, including the whitepoint achromatic response (Aw), the degree of adaptation (D), the induction factor (n), and the luminance level adaptation factor (Fl).

The display environment may be sensed with more than one sensor, and the color appearance model may be adjusted according to a weighted distance to the sensors.

A front modulator may be controlled by input video data such that the backlight and the front modulator display an image corresponding to the input video data. The backlight may be a back modulator that is also controlled by the input video data.

According to an embodiment, an apparatus includes a control circuit that implements the above-described method.

According to an embodiment, a display device includes a backlight, a sensor, and a control circuit that work together to implement the above-described method.

The following detailed description and accompanying drawings provide a further understanding of the nature and advantages of the present invention.

BRIEF DESCRIPTION OF THE DRAWINGS

FIG. 7 is a table listing the parameters in the CAM, according to an embodiment.

FIG. 8 shows the equations that relate the parameters of the CAM, according to an embodiment.

DETAILED DESCRIPTION

Figure 1:
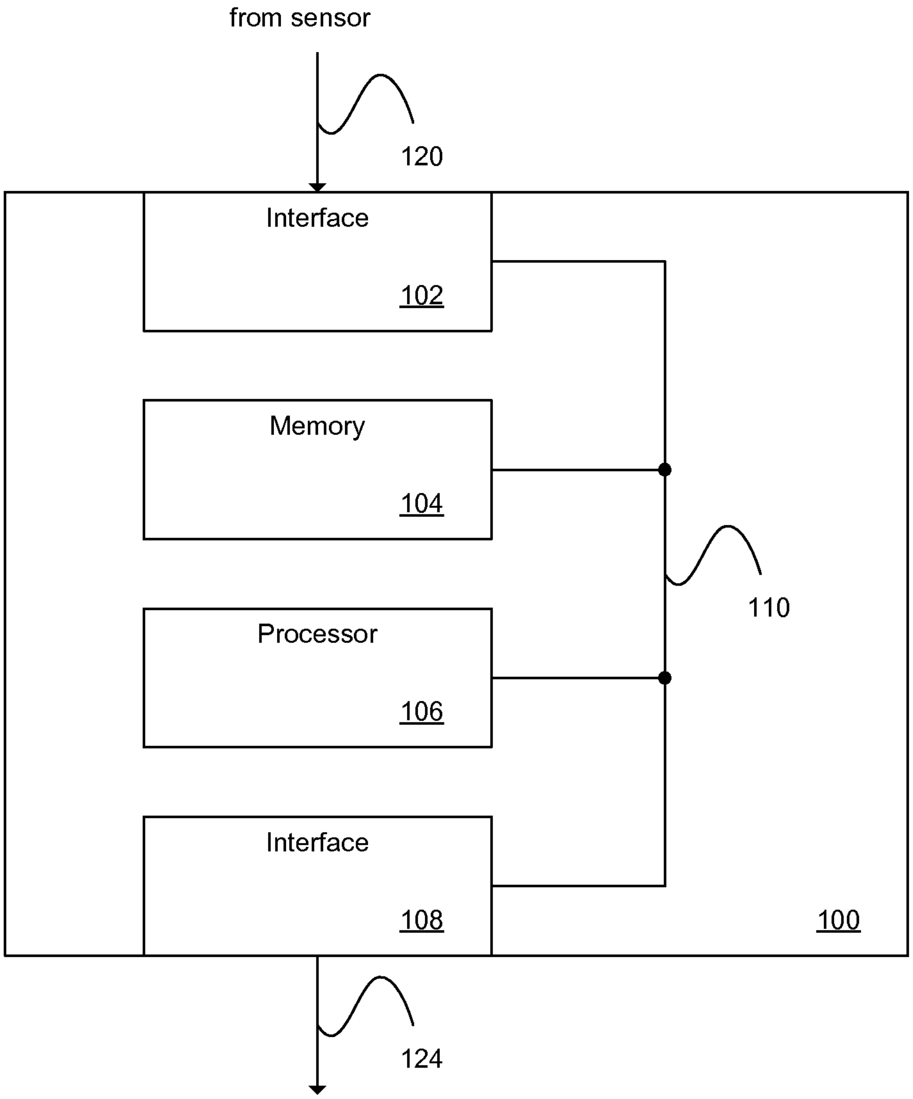
FIG. 1 is a block diagram of a control circuit that is configured to adjust the color appearance model of a display device according to the display environment, according to an embodiment.

Described herein are techniques for improving image quality based on the environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

The following description uses the term "display device." In general, this term refers to device that displays visual information (such as video data or image data). An embodiment of the present invention is directed toward a display device that includes two elements that, in combination, control the display of the visual information. One example embodiment includes a backlight and a front panel. In general, the backlight may be implemented with LEDs, and the front panel may be implemented with LCDs. Another example embodiment includes a back modulator and a front modulator. In general, the back modulator may be implemented with LEDs, and the front modulator may be implemented with LCDs. Controlling the back modulator and front modulator together may be referred to as dual modulation. (When the distinction is unimportant, the terms backlight and back modulator may be used interchangeably, and the terms front panel and front modulator may be used interchangeably.)

The following description uses the term "backlight". In general, this term refers to a light generating element that, in combination with the front panel, generates the output image. In a dual modulation device, the term "back modulator" may be used to more precisely refer to the backlight.

Note that in the video display arts, the term "backlight" may be used to refer to a different feature than the term "backlight" is to be understood according to embodiments of the present invention. This different "backlight" refers to a light that illuminates the wall behind a display, to improve viewer depth perception, to reduce viewer eye strain, etc. This different "backlight" does not relate to the generation of the output image. This different "backlight" is not related to the CAM. This different "backlight" is to be understood to be excluded from the term "backlight" in the following description of embodiments of the present invention.

FIG. 1 is a block diagram of a control circuit 100 that is configured to adjust the color appearance model of a display device according to the environment in which the display device is located, according to an embodiment. The control circuit 100 includes a sensor interface 102, a memory circuit 104, a processor circuit 106, and a video interface 108. A bus 110 interconnects the sensor interface 102, the memory 104, the processor 106, and the video interface 108. The control circuit 100 may be implemented as a single circuit device, as shown, such as with a programmable logic device. Such a programmable logic device may include functions beyond the described functions of embodiments of the present invention. Alternatively, the functions of the control circuit 100 may be implemented by multiple circuit devices that are interconnected by, for example, an external bus.

The sensor interface 102 connects to a sensor (not shown). The sensor interface 102 receives environment data 120 from the sensor. The environment data 120 corresponds to the display environment. The display environment may include information such as the color and brightness of the light in the display environment. Specific details of the environment data are provided in subsequent paragraphs.

The memory circuit 104 stores a color appearance model (CAM). In general, the CAM is used to modify the characteristics of the display device so that the output video appears as intended by the creator of the video data input into the display device. More specifically as related to an embodiment of the present invention, the CAM is used to control the color of the backlight of the display device according to the display environment, as further described below. As further detailed below, the CAM may be implemented as a memory that contains lookup tables that were generated according to environmental parameters, and circuitry (e.g., a processor) that manipulates the data in the lookup tables. According to a further embodiment, when the backlight is modulated according to the input video data, the display environment modifies the CAM.

According to an embodiment, the CAM corresponds to a modified CIECAM02 color appearance model (International Commission on Illumination 2002 CAM). Other embodiments may implement with modifications other CAMs as desired according to design preferences. Examples of such CAMs include CIECAM97 and a revised CIECAM97s by Mark Fairchild. In addition, embodiments of the present invention may also be applied to chromatic adaptation transforms (CATs) or lookup tables of color appearance information. Specific details of the CAMs are provided in subsequent paragraphs.

The second interface circuit 108 generates control signals 124. The control signals 124 control the display elements of the display device (see FIGS. 2A-2B).

The processor circuit 106 adjusts the CAM according to the color data. According to an embodiment, the data in the lookup tables used by the CAM is regenerated based on the color data. The processor circuit 106 generates the control signals 124 that control a back modulator (or backlight) of the display device (see FIGS. 2A-2B) according to the CAM having been adjusted. According to another embodiment, the control signals 124 may also control the front panel (or front modulator). The details of these adjustments are given in subsequent sections.

As an example, if the display environment is more orange than normal (e.g., sunset light via a window into a room with the display device), the color appearance model is adjusted to take this information into account. When images are displayed, their color is adjusted so that a viewer perceives the images as intended, and does not perceive them in an unintended manner due to the excess orange color in the viewing environment. As another example, artificial light and daylight produce different viewing environments; an embodiment adjusts the CAM so that the backlight takes the environment into account, and the viewer perceives the images as intended.

Although the sensor interface 102 and the video interface 108 are shown as separate interfaces, such separation is shown mainly for ease in understanding and explanation. According to another embodiment, the functions of these two interfaces may be implemented with a single interface. According to another embodiment, the functions of these interfaces may be implemented with more than two interfaces (e.g., a sensor control interface, a sensor input interface, a video input interface, and a video output interface). The number and type of interfaces may be made according to design considerations such as the speed and amount of data to be processed. According to an embodiment, the control circuit 100 may include additional interfaces to implement additional functionality beyond the functionality described in the present disclosure. According to an embodiment, the control circuit 100 may be arranged to follow the other processing elements of a display device (e.g., the upscaler, the deinterlacer, etc.).

Figure 2A:
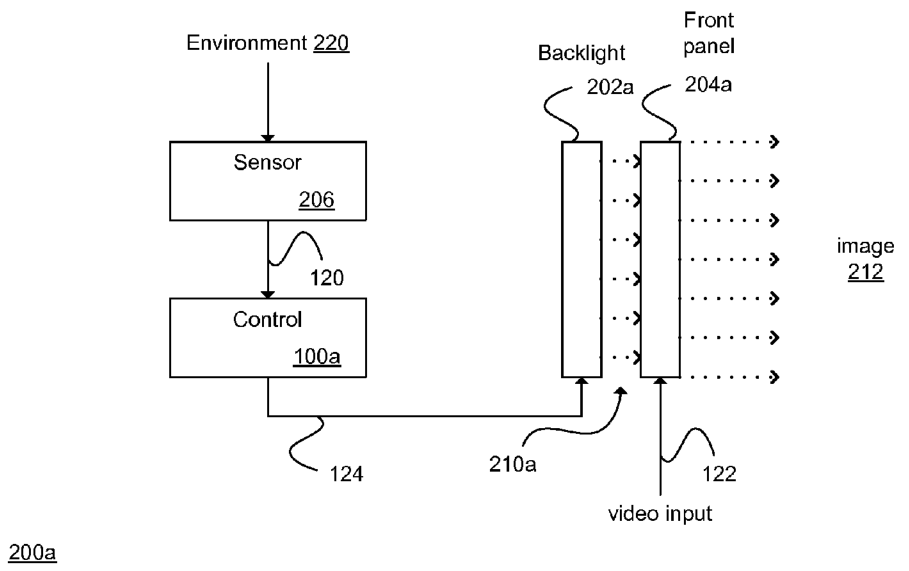
FIGS. 2A-2B are block diagrams of a display device, according to an embodiment.
Figure 2B:
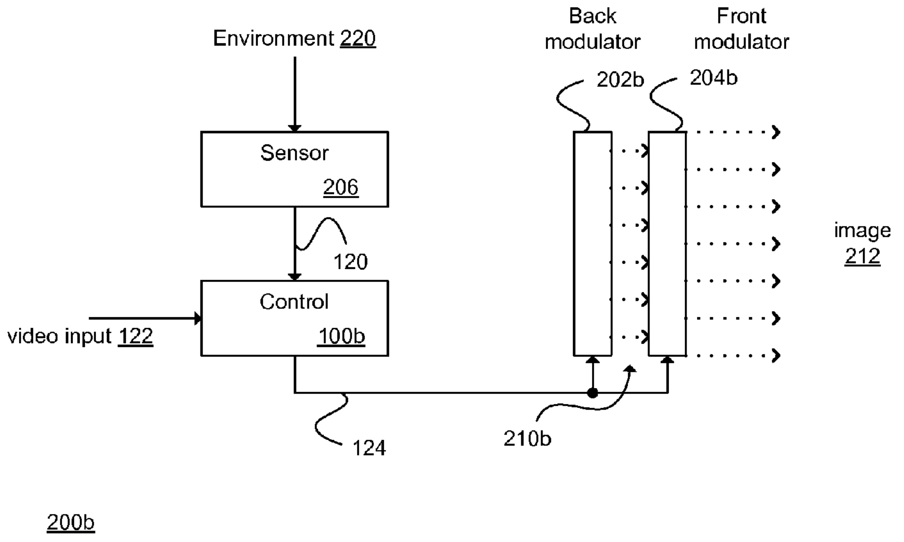

FIGS. 2A-2B provide more details of embodiments that include the control circuit 100. FIG. 2A shows an embodiment that includes a backlight, and FIG. 2B shows an embodiment that includes a back modulator. More generally, in the embodiment of FIG. 2A, the operation of the backlight is independent of the input video data; in the embodiment of FIG. 2B, the back modulator uses the input video data.

FIG. 2A is a block diagram of a display device 200*a* according to an embodiment. The display device 200*a* includes a backlight 202*a*, a front panel 204*a*, the control circuit 100*a* (see FIG. 1), and a sensor 206. The control circuit 100*a* operates as described above regarding FIG. 1 (with additional details as described below). The display device 200*a* may include other components (not shown) in order to implement the additional functionality of a display device; a description of these other components is omitted for brevity. The display device 200*a* may be a television, a video monitor, a computer monitor, a video display, a telephone screen, etc. As discussed above regarding FIG. 1, the control circuit 100*a* receives the environment data 120 and generates the control signals 124.

The backlight 202*a* receives the control signals 124 and generates backlight output signals 210*a*. The backlight output signals 210*a* generally correspond to light having a color that has been adjusted according to the environment. The backlight 202*a* may be implemented by light emitting diodes (LEDs). Each LED element may be implemented as one or more LED devices; for example, each LED element may include a red LED, a green LED and a blue LED that are controlled together to generate a particular color of light. The LEDs may be organic LEDs (OLEDs). According to an embodiment, the backlight 202*a* may be implemented by a field emission display (FED). According to an embodiment, the backlight 202*a* may be implemented by a surface-conduction electron-emitter display (SED).

The front panel 204*a* further modifies the backlight output signals 210*a* according to the video input signal 122 to produce front panel output signals 212. The front panel output signals 212 generally correspond to the image that is displayed by the device 200*a*. As a more specific example, the front panel selectively blocks the backlight output signals 210*a* to produce the front panel output signals 212. The front panel 204*a* may be implemented by liquid crystal elements of a liquid crystal display (LCD).

The sensor 206 senses the display environment 220 and generates the environment data 120. As discussed above, the environment data 120 may include information such as the color and brightness of the light in the display environment 220. Additional details of the environment data 120 are provided in subsequent paragraphs.

FIG. 2B is a block diagram of a display device 200*b* according to an embodiment. The display device 200*b* includes a back modulator 202*b*, a front modulator 204*b*, the control circuit 100*b* (see FIG. 1), and a sensor 206. The control circuit 100*b* operates as described above regarding FIG. 1 (with additional details as described below). The display device 200*b* may include other components (not shown) in order to implement the additional functionality of a display device; a description of these other components is omitted for brevity. The display device 200*b* may be a television, a video monitor, a computer monitor, a video display, a telephone screen, etc.

The control circuit 100*b* receives the environment data 120 and input video data 122, and generates the control signals 124. The input video data 122 may be still image data (e.g., pictures) in various formats, such as JPEG (Joint Photographic Experts Group) data, GIF (graphics interchange format) data, etc. The input video data 122 may be moving image data (e.g., television) in various formats, such as MPEG (Moving Picture Experts Group) data, WMV (Windows media video) data, etc. The input video data 122 may include metadata, for example Exif (Exchangeable image file format) data.

More specifically, the control signals 124 are based on both the input video data 122 and the environment data 120. According to an embodiment, the color appearance model (which is adjusted according to the environment data 120; see FIG. 1) affects the control signals 124 for the back modulator 202*b* in response to the input video data 122. Given the back modulator 202*b* being so controlled, the control signals 124 then control the scaling of the front modulator 204*b* in response to the input video data 122.

The back modulator 202*b* generates back modulator output signals 210*b* in response to the control signals 124 from the control circuit 100*b*. The back modulator output signals 210*b* generally correspond to low resolution images. The back modulator 202*b* may be implemented by light emitting diodes (LEDs). Each LED element may be implemented as one or more LED devices; for example, each LED element may include a red LED, a green LED and a blue LED that are controlled together to generate a particular color of light. The LEDs may be organic LEDs (OLEDs). According to an embodiment, the back modulator 202*b* may be implemented by a field emission display (FED). According to an embodiment, the back modulator 202*b* may be implemented by a surface-conduction electron-emitter display (SED).

The front modulator 204*b* further modifies the back modulator output signals 210*b* according to the control signals 124 to produce front modulator output signals 212. The front modulator output signals 212 generally correspond to high resolution images. As a more specific example, the front modulator 204*b* selectively blocks the back modulator output signals (low resolution image) 210*b* to produce the front modulator output signals (high resolution image) 212. The front modulator 204*b* may be implemented by liquid crystal elements of a liquid crystal display (LCD).

The sensor 206 senses the display environment 220 and generates the environment data 120. As discussed above, the environment data 120 may include information such as the color and brightness of the light in the display environment 220. Additional details of the environment data 120 are provided in subsequent paragraphs.

Comparing the embodiment of FIG. 2B to that of FIG. 2A, the control circuit 100*b* uses the environment data 120 and the input video data 122 to generate the control signals 124 for dual modulation control of the back modulator 202*b* and the front modulator 204*b*.

Figure 3:
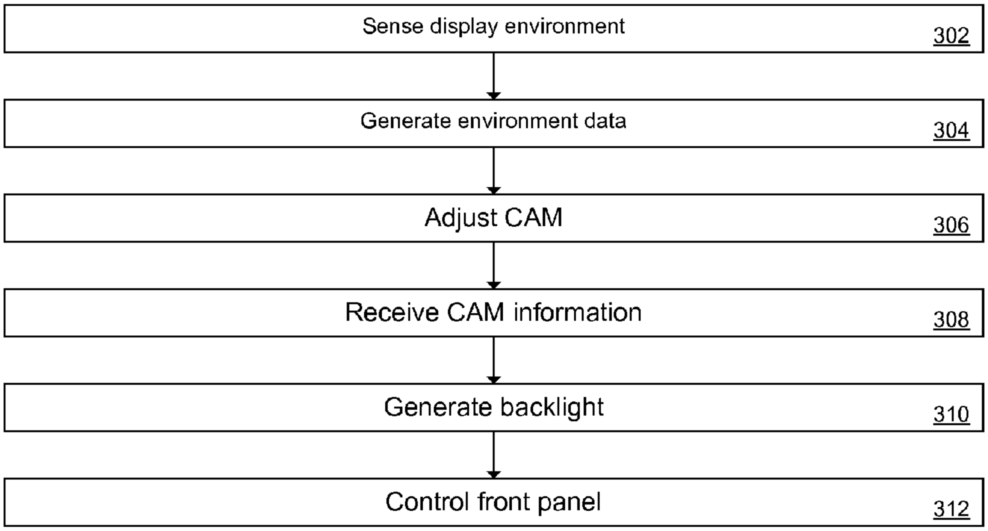
FIG. 3 is a flowchart of a method of adjusting a display device according to the display environment.

FIG. 3 is a flowchart of a method 300 of adjusting a display device according to the display environment. At least part of the method 300 may be performed by the control circuit 100 (see FIG. 1), the display device 200*a* (see FIG. 2A), or the display device 200*b* (see FIG. 2B). According to an embodiment, the method 300 may be implemented by a computer program that controls the operation of the control circuit 100, the display device 200*a*, or the display device 200*b*.

At 302, the display environment is sensed. The display environment corresponds to the color, brightness, etc. of the light in the environment that the display device is located. The sensor 206 (see FIG. 2A or 2B) may perform block 302.

At 304, environment data that corresponds to the display environment is generated. For example, the analog information sensed from the display environment (see 302) may be transformed into digital data for further processing by digital circuit components. The environment data includes color data. The sensor 206 (see FIG. 2A or 2B) may perform block 304. According to an embodiment, the sensor 206 includes an analog to digital converter circuit.

At 306, a color appearance model is adjusted according to the color data. More information regarding the specific adjustments performed is provided in subsequent paragraphs. According to an embodiment, the CAM may be implemented by lookup tables that store a set of initial values based on particular default assumptions regarding the source environment or the display environment. These initial values may be replaced according to changes in the source environment or the display environment. Changes to the source environment may be detected via the input video data, either directly or by metadata. Changes to the target environment may be detected by the sensor (see 302). The processor circuit 106 (see FIG. 1) may perform block 306 on a CAM stored in the memory 104 (see FIG. 1).

At 308, the CAM information is provided to the backlight of the display device. The CAM information may include a target white point. Since the CAM has been adjusted according to the display environment (see 306), the target white point likewise depends upon the detected display environment (see 302). More specifically, the color of the target white point depends upon the color of the display environment. The video interface 108 (see FIG. 1) may provide the CAM information as the control signals 124.

At 310, the backlight uses the CAM information (see 308) to generate its light. The color of the light generated by the backlight thus depends upon the detected display environment (see 302). The backlight 202*a* (see FIG. 2A) may perform block 310 to generate the backlight output signals 210*a*.

At 312, the display device controls its front panel to generate an image corresponding to the input video data 122 (see FIG. 2A). According to an embodiment, the front panel includes LCD elements that selectively modify the light generated by the backlight (see 310) to produce the image. Since the backlight was adjusted according to the CAM information (see 308), and since the CAM was adjusted according to the display environment (see 306), the image generated by the display device hence is adjusted according to the display environment. Thus, a viewer's perception of the image is unaffected by the color of the ambient light in the display environment. The display device 200*a* (see FIG. 2A) may perform block 312.

In summary, the method 300 is used to affect the viewer's perception of the input video data. By manipulation of the color of the light emitted by the backlight, the perception of the image is altered to match the environment. For example, if the environment has an orange color, the backlight light will be adjusted toward orange, making the image take into account the orange environment with respect to the senses of the viewer. This is to account for the fact that the viewer will adapt to the environment (e.g., an image of a white wall may be measured as orange because of the reflection of the orange light, however it will still appear white when the viewer is adapted to this environment). For on-screen colors to appear as intended by the content creator, the backlight is adjusted to match the environment.

According to another embodiment, the method 300 may be modified as follows for use with a dual modulation display device (e.g., the display device 200*b* of FIG. 2B). The block 308 may be modified such that the control signals 124 also correspond to the video input data 122. The block 310 may be modified such that the back modulator 202*b* uses the control signals 124 to generate a low resolution image (e.g., 210*b*). The block 312 may be modified to selectively block the low resolution image to generate a high resolution image (e.g., 212).

Figure 4:
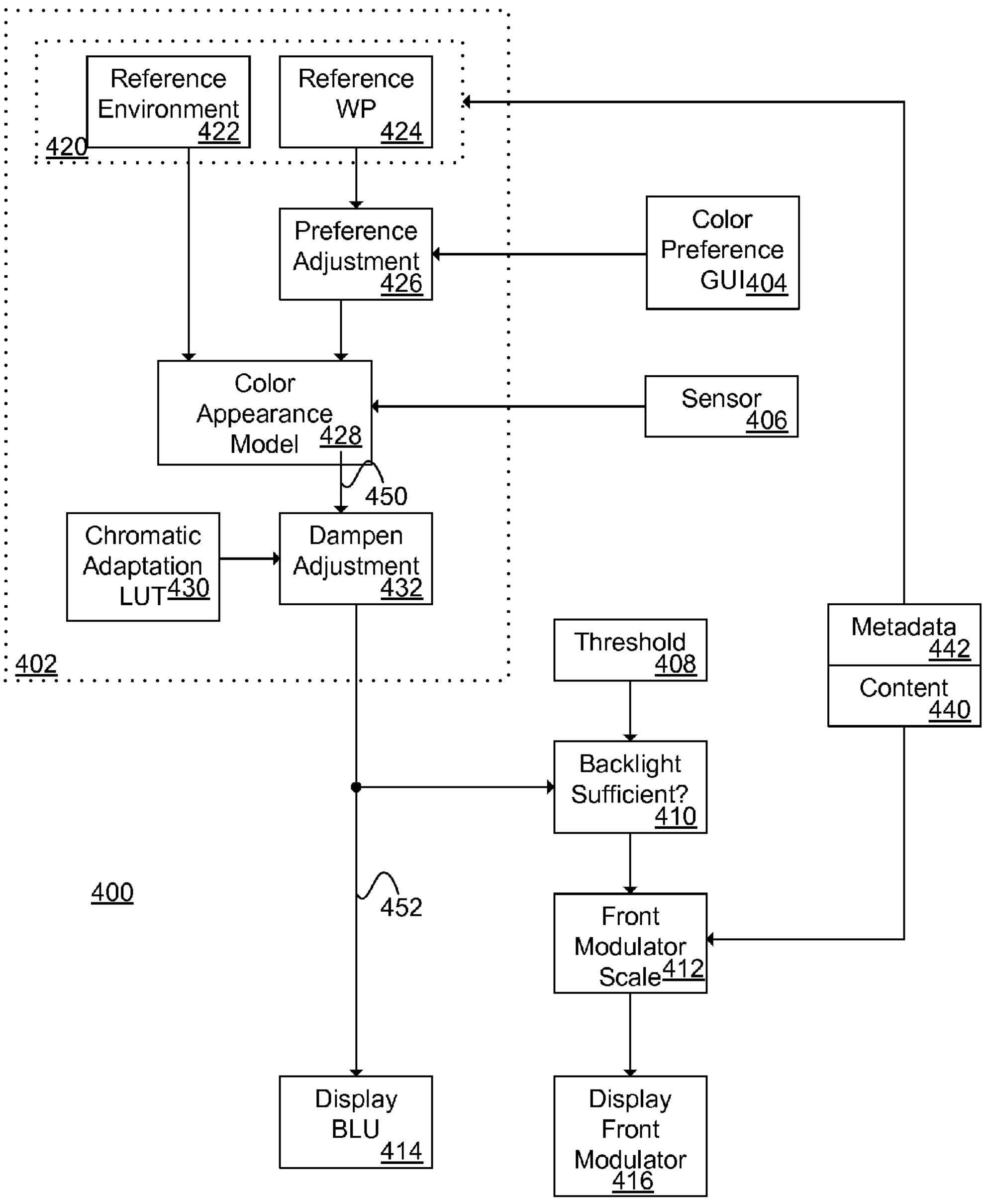
FIG. 4 is a block diagram of a display device, according to an embodiment.

FIG. 4 is a block diagram of a display device 400, according to an embodiment. The display device 400 is similar to the display device 200*a*, with additional details. The display device 400 includes a control signal generator 402, a user color preference graphical user interface (GUI) 404, a local sensor 406, a threshold memory 408, a backlight threshold evaluator circuit 410, a front modulator scaling circuit 412, a backlight unit (BLU) 414, and a front modulator 416.

The control signal generator 402 generally corresponds to the control circuit 100 (see FIG. 1). The control signal generator 402 includes a memory 420, a preference adjustment circuit 426, a color appearance model 428, a chromatic adaptation lookup table (LUT) 430, and an adjustment circuit 432. The memory 420 stores default values for use by the color appearance model 428, such as reference environment information 422 and reference white point information 424. The memory 420 may receive metadata from the content 440, such as via an Exif header 442, that may be used instead of the default values.

The preference adjustment circuit 426 receives the reference white point information 424 (or the metadata that contains replacement white point information) and interfaces with the user color preference GUI 404 to adjust the reference white point (or the replacement white point) according to user preference. For example, if the user prefers a different white point than the reference white point, the user may select it using the user color preference GUI 404; the preference adjustment circuit 426 then provides the different white point (instead of the reference white point) to the color appearance model 428. As another example, if the user prefers a different white point than the metadata white point (via, e.g., the Exif header 442), the user may select it using the user color preference GUI 404; the preference adjustment circuit 426 then provides the different white point (instead of the metadata white point) to the color appearance model 428.

The color appearance model 428 receives the reference environment information 422 and the white point information (which may be modified by the content metadata or user preference). The color appearance model 428 also implements a selected CAM for the display device 400, for example, the CIECAM02 color appearance model. The color appearance model 428 interfaces with the local sensor 406 in a manner similar to that described above with reference to FIG. 2 (note the sensor 206 interfacing to the control circuit 100). The color appearance model 428 generates a target white point 450.

The chromatic adaptation LUT 430 stores chromatic adaptation information. Chromatic adaptation is useful because chromatic adaptation by the human visual system is not instantaneous; it takes some time to adapt to a change in environment lighting color. This change takes the form of a curve over time. For example, when a large change in lighting occurs, the human visual system quickly starts to adapt to the new color, however the rate of adaption slows does as a state of full adaption takes place. Based on the target white point 450, the adjustment circuit 432 selects the appropriate chromatic adaptation information (from the chromatic adaptation LUT 430) to generate the backlight control signals 452.

The BLU 414 receives the backlight control signals 452 and generate a backlight output. Generally the backlight output corresponds to the target white point 450, which is based on the color of the environment (note the CAM 428). According to another embodiment (see, e.g., FIG. 2B), the backlight output also corresponds to a low resolution image (or series of images).

The threshold memory 408 stores minimum backlight threshold information. The backlight threshold evaluator circuit 410 compares the backlight control signals 452 and the minimum backlight threshold information. If the backlight control signals 452 are below the minimum backlight threshold, the threshold evaluator circuit 410 provides the minimum backlight threshold to the front modulator scaling circuit 412; otherwise the threshold evaluator circuit 410 provides the backlight control signals 452 to the front modulator scaling circuit 412.

The front modulator scaling circuit 412 receives the content 440 and the backlight information from the threshold evaluator circuit 410, and generates control signals for the front modulator 416 that scale the display of the content correctly given the backlight information.

Figure 5:
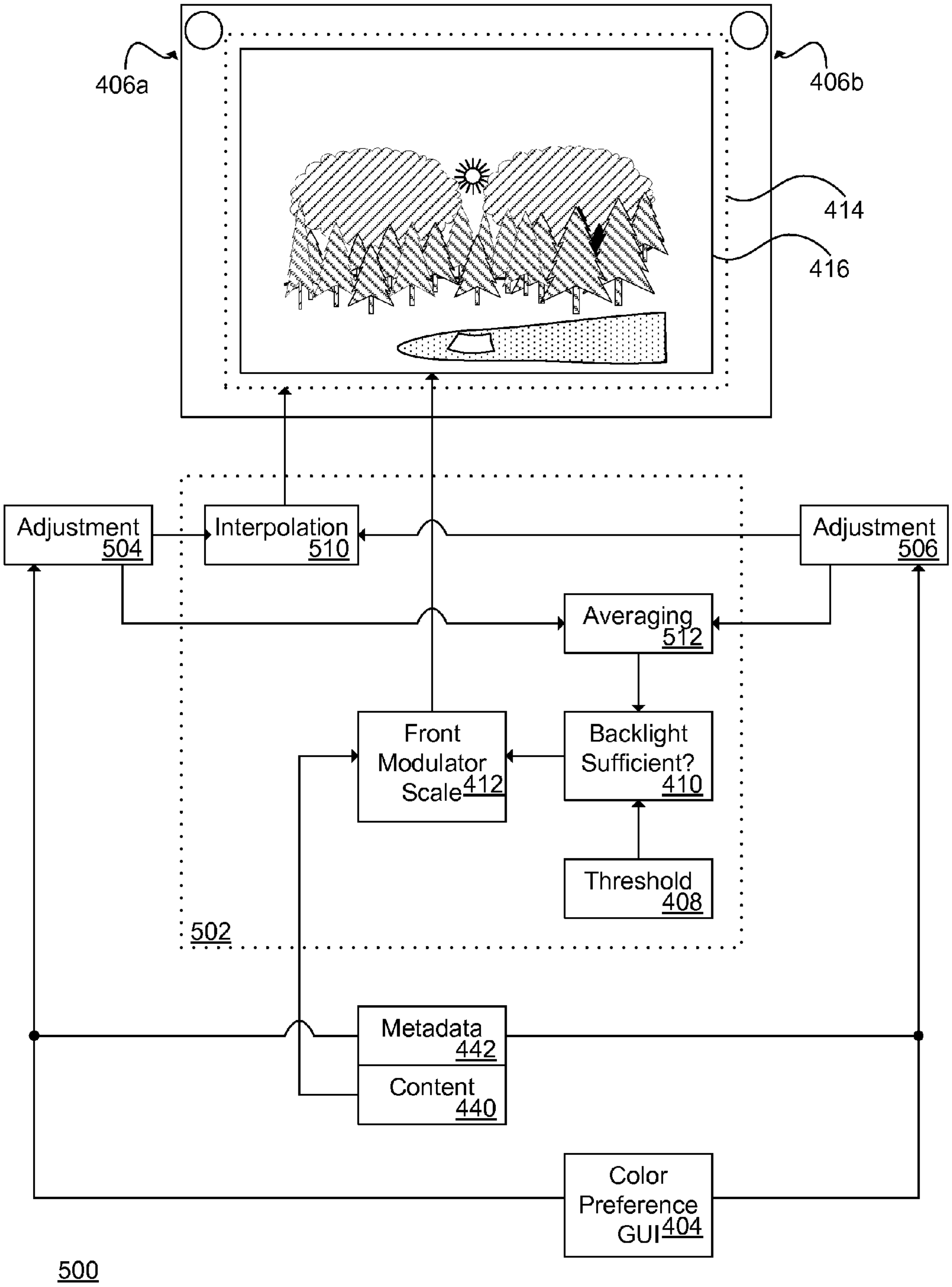
FIG. 5 is a block diagram of a display device, according to an embodiment.

FIG. 5 is a block diagram of a display device 500, according to an embodiment. In general, the display device 500 is similar to the display device 400 (see FIG. 4) or the display device 200*a* (see FIG. 2A), with the addition of a second sensor and related control circuitry. The display device 500 includes a control signal generator 502, a first adjustment circuit 504, a second adjustment circuit 506, an interpolation circuit 510, and an averaging circuit 512. The BLU 414 is a locally modulated BLU, as further detailed below. The display device 500 also includes a number of components similar to the display device 400 (see FIG. 4), such as front modulator 416, etc. for which a discussion is not repeated.

The display device 500 includes two sensors 406*a* and 406*b*. The sensors 406*a* and 406*b* may be mounted on opposing sides of the display device 500. The sensor 406*a* provides its environment information to the adjustment circuit 504, and the sensor 406*b* provides its environment information to the adjustment circuit 506. The adjustment circuit 504 generates dampened target backlight information according to the environment detected by the sensor 406*a*, and the adjustment circuit 506 generates dampened target backlight information according to the environment detected by the sensor 406*b*. The adjustment circuits 504 and 506 may be further configured by the user color preference GUI 404 in a manner similar to that described above in FIG. 4.

The interpolation circuit 510 receives the dampened target backlight information from the adjustment circuits 504 and 506, interpolates the appropriate backlight settings across the backlight according to the dampened target backlight information, and generates the appropriate backlight control signals for the BLU 414. For example, for regions of the BLU 414 closer to the sensor 406*a*, the dampened target backlight information from the adjustment circuit 504 may be weighted more heavily than the dampened target backlight information from the adjustment circuit 506. As another example, for regions of the BLU 414 closer to the sensor 406*b*, the dampened target backlight information from the adjustment circuit 506 may be weighted more heavily than the dampened target backlight information from the adjustment circuit 504. The weighting can be a linear weighting based on the distance from the region to the respective sensors. For example, if a region is 10 inches from the sensor 406*a* and 40 inches from the sensor 406*b*, the dampened target backlight information corresponding to the sensor 406*a* is weighted at 0.8 ($4/5$) and that corresponding to the sensor 406*b* is weighted at 0.2 ($1/5$). The weighting can be a geometric weighting based on the square of the distance from the region to the respective sensors. For example, if a region is 10 inches from the sensor 406*a* and 40 inches from the sensor 406*b*, the dampened target backlight information corresponding to the sensor 406*a* is weighted at 0.96 ($24/25$) and that corresponding to the sensor 406*b* is weighted at 0.04 ($1/25$).

The averaging circuit 512 receives the dampened target backlight information from the adjustment circuits 504 and 506, averages the dampened target backlight information, and provides the average to the backlight threshold evaluator circuit 410. The front modulator scaling circuit 412 then generates the control signals for the front modulator 416 based on the information provided by the backlight threshold evaluator circuit 410 in a manner similar to that described above in FIG. 4.

Environment Data Details

According to an embodiment, the environment data sensed corresponds to the whitepoint of the environment in absolute terms. The sensor (e.g., the sensor 206 of FIG. 2A) measures the colors of the environment, generates an average from the measurement, and provides the average (as a single color, e.g. in RGB or XYZ color space) as the environment data. The CAM then uses this environment data as input parameters corresponding to the adapting luminance parameter (La) and the adapting whitepoint.

CAM Details

Figure 6:
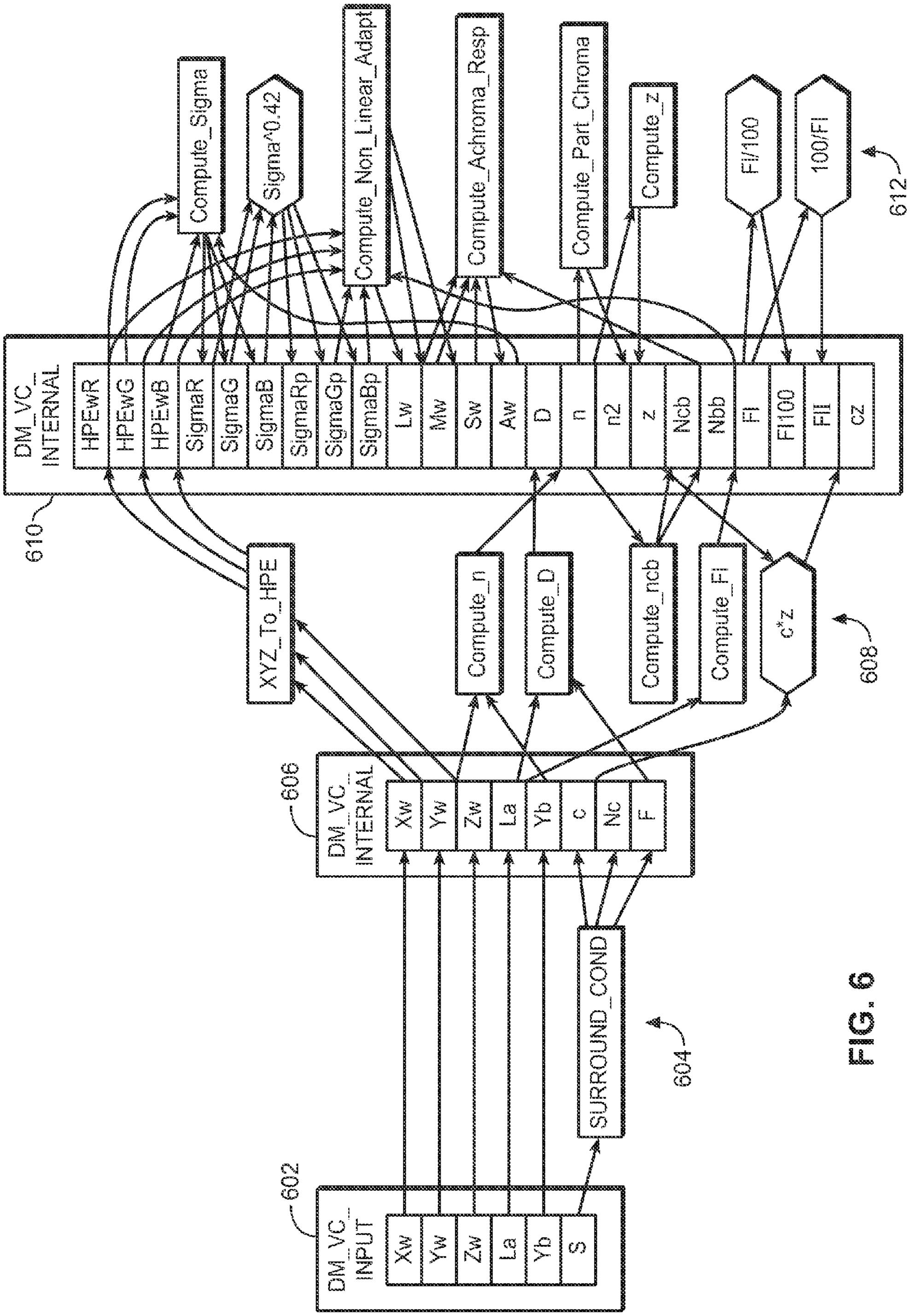
FIG. 6 is a diagram illustrating the relationships between the parameters of the CAM that may be pre-calculated based on environment conditions, according to an embodiment.

According to an embodiment, the color appearance model implemented as the CAM 428 (see FIG. 4) corresponds to a modified CIECAM02 color appearance model. FIGS. 6-8 show further details regarding this CAM. FIG. 6 is a diagram illustrating the relationships between the parameters of the CAM that may be pre-calculated based on environment conditions, FIG. 7 is a table listing the parameters in the CAM, and FIG. 8 shows the equations that relate the parameters of the CAM.

The parameters shown in FIG. 6 may be pre-calculated from either the source or target viewing condition. The source viewing condition relates to the environment where the content was created (and artistically signed-off on). The target viewing condition relates to the environment where a viewer is viewing the environment.

In general, the source viewing conditions are very similar for the majority of content (e.g., color timing suites are for the most part very similar to each other); however, the source viewing environment information may be included with the content for more accurate rendition at the target viewing site. Target viewing conditions may be measured by a sensor as described above (see, e.g., FIG. 2A). For the elements shown in FIG. 6, the sensor may be used to determine the target adapting white point (Xw, Yw, and Zw) and the target adapting luminance level (La) (also referred to as the target adapting field luminance level).

According to an embodiment, the relative luminance (Yb, also referred to as the relative background luminance) and surround luminance (S) parameters have notably less impact than the other parameters on the CAM implemented (e.g., the modified CIECAM02 described above). In such an embodiment, the Yb and S parameters are not determined by the sensor. Instead, preset values are used, and the Yb and S parameters are kept static. According to another embodiment, the Yb and S parameters have more of an influence on the CAM implemented; in such case, the sensor may also be used to measure the Yb and S of the display environment in order to determine the Yb and S parameters.

The process flow for performing the calculations for the CAM is as follows (with reference to FIG. 6). Note that some processing depends upon other processing, so the process flow in FIG. 6 is not just one way left-to-right. In box 602, the sensor makes measurements corresponding to the input parameters (e.g., Xw, Yw, Zw, La, etc.). At box 604, the display device (e.g., the processor 106) processes the S parameter into the surround conditions c, Nc and F (see above regarding TABLE 1). At box 606, the environment information, including the surround condition information, is stored in the display device (e.g., in the memory 104).

At 608, the display device (e.g., the processor 106) processes the environment information into the various CAM parameters. This processing may implement the equations shown in FIG. 8 (e.g., to compute n, D, etc.) as well as converting the XYZ color space information to Hunt-Pointer-Estevez (HPE) color space information. Rectangular boxes (e.g., for XYZ_To_HPE) in 608 denote processing according to standard color space equations or to the equations of FIG. 8. Hexagonal boxes (e.g., for c*z) denote straightforward equations. The specifics of the equations implemented by the processing of 608 are shown in FIG. 7 and FIG. 8.

At 610, the display device (e.g., the memory 104) stores the CAM parameters corresponding to the environment information (e.g., as the CAM 428). Note that some of these parameters (e.g, z, Fl, etc.) depend upon further processing in 612.

At 612, the display device (e.g., the processor 106) performs processing on some of the CAM parameters in 610 to generate additional CAM parameters. For example, the whitepoint in HPE space is converted to the whitepoint sigma. As discussed above regarding 608, some of the parameters in 612 depend upon other parameters (e.g., SigmaRp depends upon SigmaR, etc.). The specifics of the equations implemented by the processing of 612 are shown in FIG. 7 and FIG. 8.

According to an embodiment, instead of using the environment information sensed by the sensor as inputs to equations, the environment information is used as an index to access pre-calculated parameters stored in memory (e.g., the memory 104). For example, sixteen sets of CAM parameters may be stored in memory, corresponding to sixteen different color measurements. For example, the sixteen sets can correspond to a red environment, a red-orange environment, an orange environment, etc. The display device (e.g., the processor 106) then uses the environment information to select the most appropriate set of CAM parameters.

For example, the sets of CAM parameters may be indexed according to a range of colors in RGB (or XYZ, etc.) color space. The sensor senses the color in the display environment and generates the environment information as a single RGB color (e.g., as an average of all the information sensed) corresponding to the display environment. The display device (e.g., the processor 106) then selects the set of CAM parameters whose index range includes that single color.

As another example, the sets of CAM parameters may be indexed according to a single index color. The display device (e.g., the processor 106) then selects the set of CAM parameters whose index color is closest to the sensed color. The closeness may be based on the linear distance between the sensed color and the index colors. In the case where each index color includes a number of components (e.g., an index color in the RGB color space includes R, G and B components), the closeness may be based on the cumulative distance between each component of the sensed color and the index colors.

Figure 9:
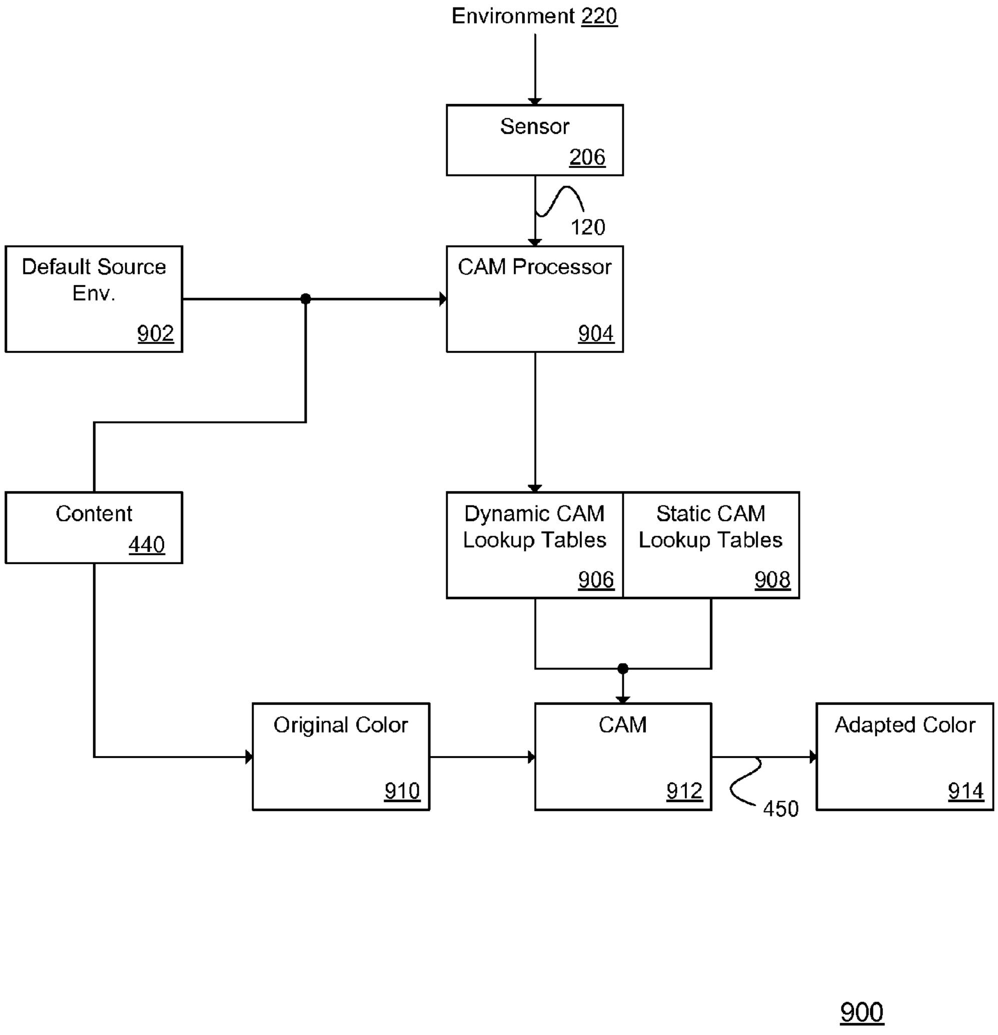
FIG. 9 is a block diagram of a display system, according to an embodiment.

FIG. 9 is a block diagram of a display system 900, according to an embodiment. The display system 900 includes a sensor 206, a memory 902 that stores default source environment data, a CAM processor 904 that generates CAM lookup tables, a memory 906 that stores dynamic CAM lookup tables, a memory 908 that stores static CAM lookup tables, a memory 910 that stores original color information, a color appearance model 912, and a memory 914 that stores adapted color information. Note that many of the components of the display system 900 are similar to, or may be implemented by, components previously described with reference to other figures. For example, the control circuit 100 (see FIG. 1) may implement the memories 902, 906, 908, 910 and 914 via the memory 104; the processor 106 may implement the CAM processor 904; the processor 106 and the memory 104 may implement the CAM 912.

As discussed above regarding other embodiments, the sensor 206 senses the light in the environment 220 where the display device 900 is located and provides the environment data to the CAM processor 904. The CAM processor 904 also receives the default source environment data from the memory 902. The CAM processor 904 may also receive source environment data from the video content 440, for example as metadata in the content. (The display device 900 may use the default source environment data when the content does not provide the source environment data.) The CAM processor 904 builds the dynamic CAM lookup tables based on the environment data and the source environment data, as discussed above.

The memory 906 stores the dynamic CAM lookup tables generated by the CAM processor 904, and the memory 908 stores the static CAM lookup tables. The dynamic CAM lookup tables depend upon the environment data, and the static CAM lookup tables do not. Thus, the content of the lookup tables may vary depending upon the environmental parameters that are sensed. For example, as discussed above with reference to FIG. 6, the sensor is used to sense Xw, Yw, Zw and La, and the sensor does not sense Yb and S. Thus, the dynamic CAM lookup tables depend upon Xw, Yw, Zw and La, and the static CAM lookup tables depend upon Yb and S. According to another embodiment in which the sensor also detects Yb, the parameters related to Yb would be in the dynamic CAM lookup tables instead of the static CAM lookup tables. Similarly, according to another embodiment in which the sensor also detects S, the parameters related to S would be in the dynamic CAM lookup tables instead of the static CAM lookup tables.

The memory 910 stores the original color information, which the display device 900 determines according to the video content 440. The original color information may be in the form of a whitepoint that corresponds to the video content 440.

The CAM 912 uses the lookup tables in the memories 906 and 908, and the original color information in the memory 910, to generate the CAM used by the display device 900. The process the CAM 912 performs may be as described above regarding FIG. 6. The output of the CAM 912 may be the target white point 450 as discussed above regarding FIG. 4, which may be stored in the memory 914 as the adapted backlight information for controlling the backlight of the display device 900.

Implementation Details

An embodiment of the invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of adjusting a display device according to a display environment, comprising:

sensing the display environment of the display device;

wherein sensing the display environment comprises sensing the display environment with a first sensor and a second sensor;

generating environment data that corresponds to the display environment, wherein the environment data includes color data;

wherein the color data comprises first color data and second color data corresponding to the first sensor and the second sensor respectively;

adjusting a color appearance model according to the color data;

wherein adjusting the color appearance model according to the color data comprises:

adjusting the color appearance model according to the first color data and the second color data as a function of distance to the first sensor and to the second sensor;

generating a control signal according to the color appearance model having been adjusted;

controlling a backlight of the display device according to the control signal; and storing user white point data that differs from reference white point data, wherein the color appearance model is configured to receive reference environment data and the user white point data, and wherein the adjusted color appearance model is configured to generate a target white point data that corresponds to the control signal, further comprising:

scaling a front modulator according to the target white point when the target white point exceeds a threshold; and scaling the front modulator according to the threshold when the target white point does not exceed the threshold.

2. The method of claim 1, further comprising:

generating light from the backlight in accordance with the backlight being controlled by the control signal.

3. The method of claim 1, wherein the color data includes an adapting white point.

4. The method of claim 1, wherein the color data includes an adapting white point having an X component, a Y component and a Z component.

5. The method of claim 1, wherein the environment data further includes adapting luminance data (La), further comprising:

adjusting the color appearance model according to the adapting luminance data.

6. The method of claim 1, further comprising:

adjusting the color appearance model according to relative luminance data (Yb), wherein the environment data does not include the relative luminance data.

7. The method of claim 1, further comprising:

adjusting the color appearance model according to surround luminance data (S), wherein the environment data does not include the surround luminance data.

8. The method of claim 1, wherein the color appearance model corresponds to a CIECAM02 (International Commission on Illumination 2002 Color Appearance Model).

9. The method of claim 1, wherein sensing the display environment comprises:

sensing a color of the display environment.

10. The method of claim 1, wherein adjusting the color appearance model according to the color data comprises:

adjusting a whitepoint achromatic response (Aw) of the color appearance model according to the color data.

11. The method of claim 1, wherein adjusting the color appearance model according to the color data comprises:

adjusting a degree of adaptation (D) of the color appearance model according to the color data.

12. The method of claim 1, wherein adjusting the color appearance model according to the color data comprises:

adjusting an induction factor (n) of the color appearance model according to the color data.

13. The method of claim 1, wherein adjusting the color appearance model according to the color data comprises:

adjusting a luminance level adaptation factor (Fl) of the color appearance model according to the environment data.

14. The method of claim 1, further comprising:

receiving input video data; and controlling a front modulator according to the input video data such that the backlight and the front modulator display an image corresponding to the input video data.

15. The method of claim 1, wherein the backlight comprises a back modulator, further comprising:

receiving input video data;

controlling the back modulator and a front modulator according to the input video data such that the back modulator and the front modulator display an image corresponding to the input video data.

16. A method of adjusting a display device according to a display environment, comprising:

sensing the display environment of the display device;

wherein sensing the display environment comprises sensing the display environment with a first sensor and a second sensor;generating environment data that corresponds to the display environment, wherein the environment data includes color data;

wherein the color data comprises first color data and second color data corresponding to the first sensor and the second sensor respectively;

adjusting a color appearance model according to the color data;

wherein adjusting the color appearance model according to the color data comprises:

adjusting the color appearance model according to the first color data and the second color data as a function of distance to the first sensor and to the second sensor;

generating a control signal according to the color appearance model having been adjusted;

controlling a backlight of the display device according to the control signal; and storing user white point data that differs from reference white point data, wherein the color appearance model is configured to receive reference environment data and the user white point data, and wherein the adjusted color appearance model is configured to generate a target white point data that corresponds to the control signal for further adjustments of the display device when the target point exceeds a threshold.

17. The method of claim 16, wherein the method further comprises adjusting a modulator of the display device based on the target white point.

18. The method of claim 17, wherein the method further comprises adjusting a modulator of the display device by a first adjustment technique when the target white point exceeds a threshold and a second adjustment technique when the target white point does not exceed the threshold.

19. The method of claim 16, wherein the further adjustments comprise scaling a modulator of the display device based on the target white point.

* * * * *